US012694116B2

(12) United States Patent
Liu et al.

(10) Patent No.: US 12,694,116 B2
(45) Date of Patent: Jul. 28, 2026

(54) MANAGING DIFFERENT VERSIONS OF SECURITY INFORMATION IN AN ORCHESTRATION PLATFORM

(71) Applicant: International Business Machines Corporation, Armonk, NY (US)

(72) Inventors: Xinpeng Liu, Austin, TX (US); Jing Jing Wei, Beijing (CN); Jia Lin Wang, Beijing (CN); Ping Mei, Beijing (CN); Da Guang Sun, Changping (CN); Yang Kang, Beijing (CN); Bing Ding, Beijing (CN); Yi Fan Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 18/943,019

(22) Filed: Nov. 11, 2024

(65) Prior Publication Data

US 2026/0134102 A1     May 14, 2026

(51) Int. Cl.
G06F 21/57 (2013.01)

(52) U.S. Cl.
CPC ........ G06F 21/57 (2013.01); *G06F 2221/034* (2013.01)

(58) Field of Classification Search
CPC .......... G06F 8/60; G06F 8/65–66; G06F 8/70; G06F 8/71; G06F 9/45558; G06F 21/57–577; G06F 21/60; G06F 21/602; G06F 21/604; G06F 21/62; G06F 21/6245–6263; G06F 2009/45562–45575; G06F 2221/034;

(Continued)

(56) References Cited

U.S. PATENT DOCUMENTS

| | | | |
|---|---|---|---|
| 10,819,701 B2 | 10/2020 | Bose et al. | |
| 2023/0315867 A1 | 10/2023 | Bakshan et al. | |
| 2024/0137372 A1* | 4/2024 | Leung | H04L 63/1416 |

(Continued)

FOREIGN PATENT DOCUMENTS

CN        109831500 B        5/2019

OTHER PUBLICATIONS

"External Secrets", External Secrets Operator, 2004, 1 page.

(Continued)

*Primary Examiner* — Kevin Bechtel
(74) *Attorney, Agent, or Firm* — Yee & Associates, P.C.

(57)        ABSTRACT

A computer-implemented method for managing versions of security information. A processor set receives a request to add a first version of security information for a number of pods in an orchestration platform. The number of pods comprises pods to be deployed in the orchestration platform. The processor set stores the first version of the security information into a set of security information in a metadata database in the orchestration platform. The set of security information comprises the security information of different versions. The processor set stores a new destination rule for the first version of the security information into a set of destination rules in the metadata database. Destination rules in the set of destination rules defines versions of the security information to be consumed by different pods from the number of pods. The processor set deploys a pod from the number of pods.

20 Claims, 7 Drawing Sheets

(58) Field of Classification Search
CPC ..... H04L 63/10–108; H04L 63/20–205; H04L
63/30–306
See application file for complete search history.

(56) References Cited

U.S. PATENT DOCUMENTS

2024/0250997 A1 \* 7/2024 Lahiri ..................... H04L 63/20
2025/0265071 A1 \* 8/2025 Ananthesweran ........ G06F 8/60

OTHER PUBLICATIONS

"Production-Grade Container Orchestration", Kubernets, 2024, 1
page.
Stebich Ryan. "Leverage AWS secrets stores from EKS Fargate
with External Secrets Operator", AWS, Amazon, Jun. 30, 2022, 15
pages.
Tuladhar Puru. "Manage Kubernetes Secrets using AWS Secrets
Manager", Giant Swarm, Apr. 18, 2023, 23 pages.

\* cited by examiner

COMPUTING ENVIRONMENT
100

```
kind: Deployment
apiVersion: apps/v1
metadata:
    name: kmipserver
    namespace: KMIP_NS
    labels:
        app: kmipserver
        index: 1st spec:
    replicas: SERVER_NUM
    revisionHistoryLimit: 0
    selector:
        matchLabels:
            app: kmipserver
    template:
        metadata:
            name: kmipserver
            labels:
                app: kmipserver
            annotations:
                sidecar.istio.io/inject: "false"
        spec:
            containers:
                -
                    name: kmipserver
                    image: 'us.icr.io/kpadapter/kmip:IMAGE_TAG'
                    env:
                        -
                            name: PYTHONPATH
                            value: /kmipadapter
                        ......
                        -
                            name: KMIP_KEY
                            valueFrom:
                                secretKeyRef:
                                    name: kmip-private-key
                                    key: kmip.key
                        ......
```

Figures 3B, 3C:
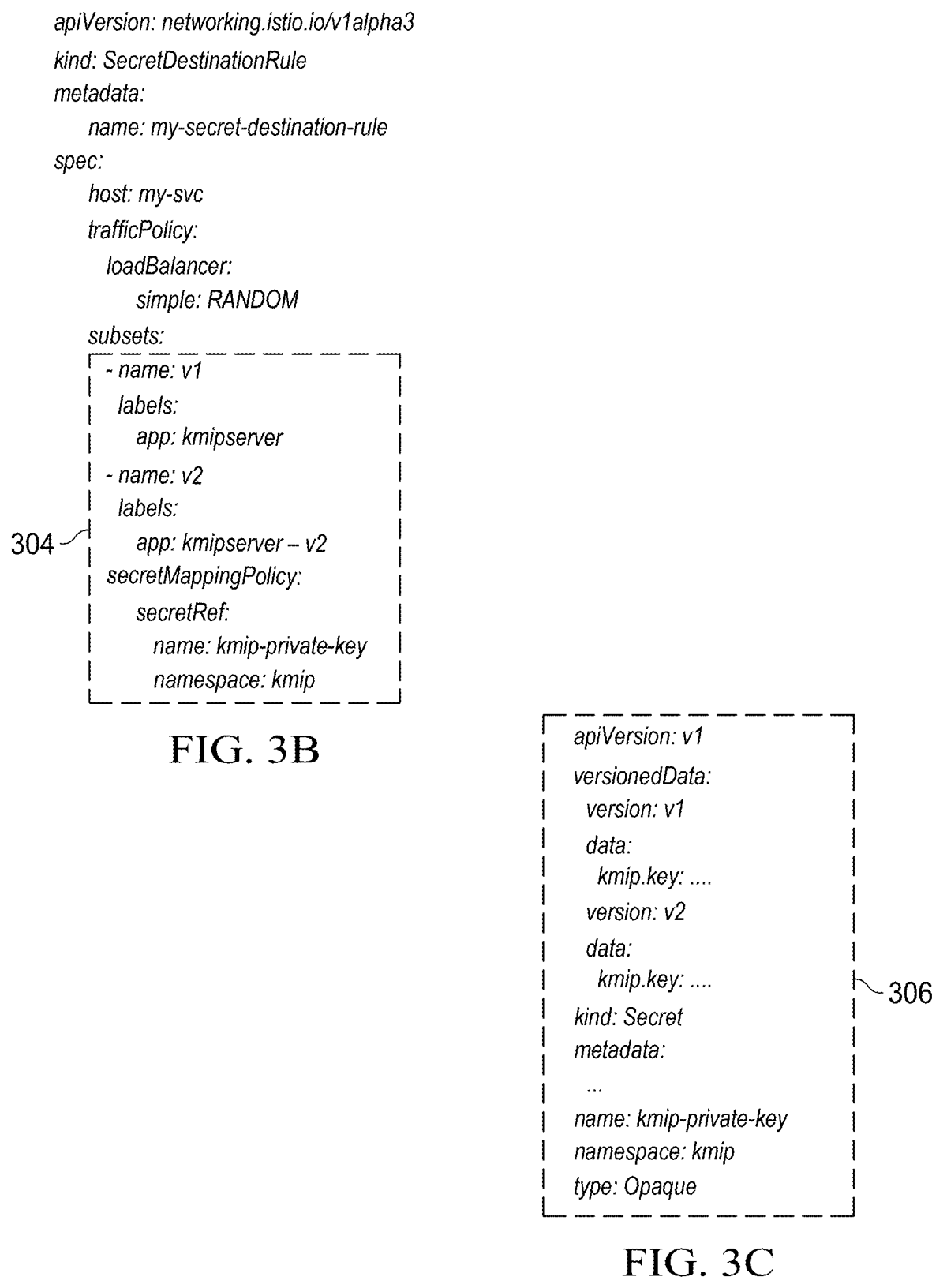

```
apiVersion: networking.istio.io/v1alpha3
kind: SecretDestinationRule
metadata:
    name: my-secret-destination-rule
spec:
    host: my-svc
    trafficPolicy:
        loadBalancer:
            simple: RANDOM
    subsets:
    - name: v1
        labels:
            app: kmipserver
    - name: v2
        labels:
            app: kmipserver – v2
    secretMappingPolicy:
        secretRef:
            name: kmip-private-key
            namespace: kmip
```

```
apiVersion: v1
versionedData:
    version: v1
    data:
        kmip.key: ....
    version: v2
    data:
        kmip.key: ....
kind: Secret
metadata:
    ...
    name: kmip-private-key
    namespace: kmip
    type: Opaque
```

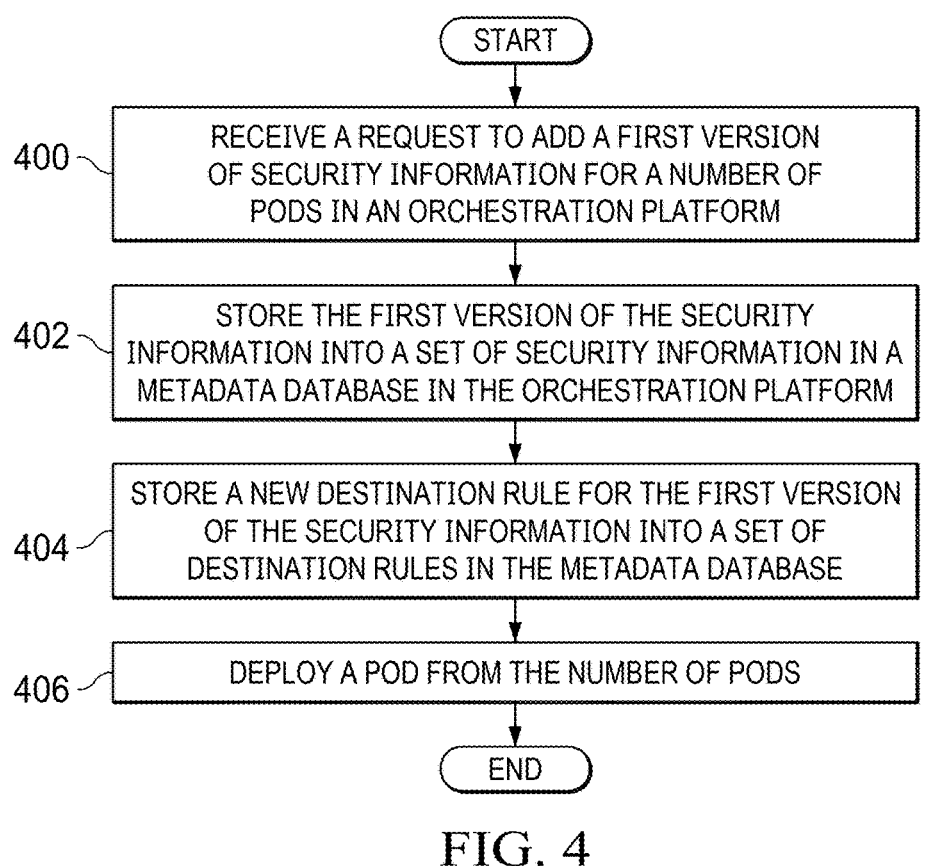

START

400 — RECEIVE A REQUEST TO ADD A FIRST VERSION OF SECURITY INFORMATION FOR A NUMBER OF PODS IN AN ORCHESTRATION PLATFORM

402 — STORE THE FIRST VERSION OF THE SECURITY INFORMATION INTO A SET OF SECURITY INFORMATION IN A METADATA DATABASE IN THE ORCHESTRATION PLATFORM

404 — STORE A NEW DESTINATION RULE FOR THE FIRST VERSION OF THE SECURITY INFORMATION INTO A SET OF DESTINATION RULES IN THE METADATA DATABASE

406 — DEPLOY A POD FROM THE NUMBER OF PODS

END

FIG. 4

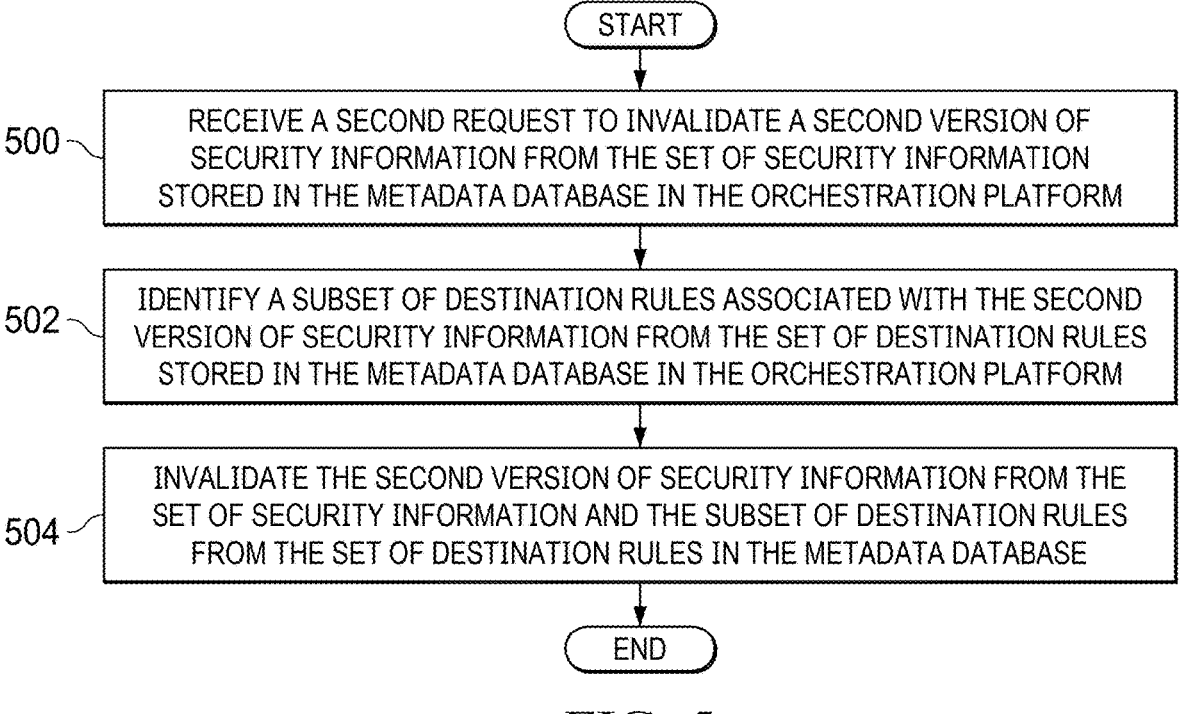

START

500 — RECEIVE A SECOND REQUEST TO INVALIDATE A SECOND VERSION OF SECURITY INFORMATION FROM THE SET OF SECURITY INFORMATION STORED IN THE METADATA DATABASE IN THE ORCHESTRATION PLATFORM

502 — IDENTIFY A SUBSET OF DESTINATION RULES ASSOCIATED WITH THE SECOND VERSION OF SECURITY INFORMATION FROM THE SET OF DESTINATION RULES STORED IN THE METADATA DATABASE IN THE ORCHESTRATION PLATFORM

504 — INVALIDATE THE SECOND VERSION OF SECURITY INFORMATION FROM THE SET OF SECURITY INFORMATION AND THE SUBSET OF DESTINATION RULES FROM THE SET OF DESTINATION RULES IN THE METADATA DATABASE

END

FIG. 5

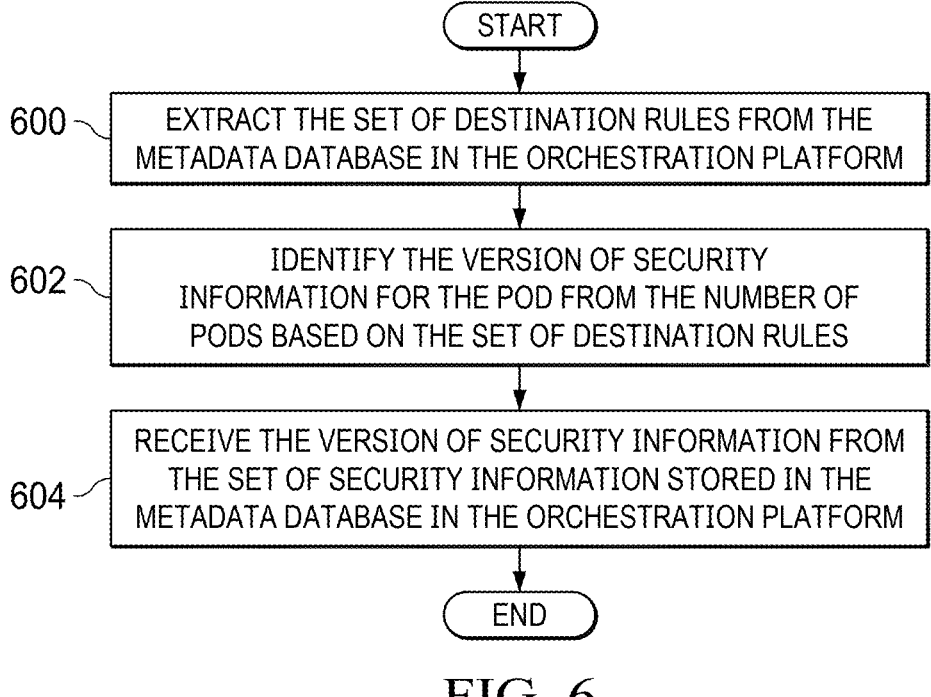

600 — EXTRACT THE SET OF DESTINATION RULES FROM THE METADATA DATABASE IN THE ORCHESTRATION PLATFORM

602 — IDENTIFY THE VERSION OF SECURITY INFORMATION FOR THE POD FROM THE NUMBER OF PODS BASED ON THE SET OF DESTINATION RULES

604 — RECEIVE THE VERSION OF SECURITY INFORMATION FROM THE SET OF SECURITY INFORMATION STORED IN THE METADATA DATABASE IN THE ORCHESTRATION PLATFORM

FIG. 6

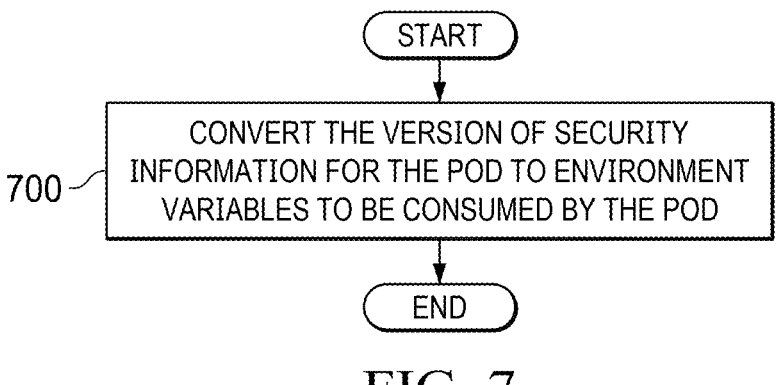

700 — CONVERT THE VERSION OF SECURITY INFORMATION FOR THE POD TO ENVIRONMENT VARIABLES TO BE CONSUMED BY THE POD

FIG. 7

MANAGING DIFFERENT VERSIONS OF SECURITY INFORMATION IN AN ORCHESTRATION PLATFORM

BACKGROUND

The disclosure relates generally to managing security information in an orchestration platform.

An orchestration platform is designed to simplify the deployment management and scaling of containerized applications. An orchestration platform usually provides an integrated environment that offers web console and integrated development environments to streamline application development process. In this case, an orchestration platform can be used to automate various aspects of container managements such as automated scaling both horizontally and vertically to handle workloads efficiently. For example, an orchestration platform can adjust number of pod replicas based on resource usage for horizontal scaling and modifies the resources allocated to individual pods for vertical scaling.

Security information in an orchestration platform refers to the data, protocols, and mechanisms implemented to ensure confidentiality, integrity, and availability of processes, data, and services within the platform. In this case, security information in the orchestration platform is essential for protecting sensitive data, ensuring compliance, and maintaining the integrity of workflows and automated processes.

SUMMARY

According to one illustrative embodiment, a computer-implemented method for managing versions of security information is provided. A processor set receives a request to add a first version of security information for a number of pods in an orchestration platform. The number of pods includes pods to be deployed in the orchestration platform. The processor set stores the first version of the security information into a set of security information in a metadata database in the orchestration platform. The set of security information includes the security information of different versions. The processor set stores a new destination rule for the first version of the security information into a set of destination rules in the metadata database. Destination rules in the set of destination rules defines versions of the security information to be consumed by different pods from the number of pods. The processor set deploys a pod from the number of pods. The pod from the number of pods consumes a version of the security information during deployment based on the set of destination rules. According to other illustrative embodiments, a computer system, and a computer program product for managing versions of security information in an orchestration platform are provided.

BRIEF DESCRIPTION OF THE DRAWINGS

FIG. 3A is an illustration of a sample deployment script for deploying a pod in accordance with an illustrative embodiment;

FIG. 3B is an illustration of a sample destination rule in accordance with an illustrative embodiment;

FIG. 3C is an illustration of a sample security information in accordance with an illustrative embodiment;

FIG. 4 is a flowchart of a process for managing versions of security information in accordance with an illustrative embodiment;

FIG. 5 is a flowchart of a process for invalidating a version of security information in accordance with an illustrative embodiment;

FIG. 6 is a flowchart of a process for identifying a version of security information to deploy a pod in accordance with an illustrative embodiment;

FIG. 7 is a flowchart of a process for converting the version of security information to environment variables in accordance with an illustrative embodiment;

DETAILED DESCRIPTION

Figure 1:
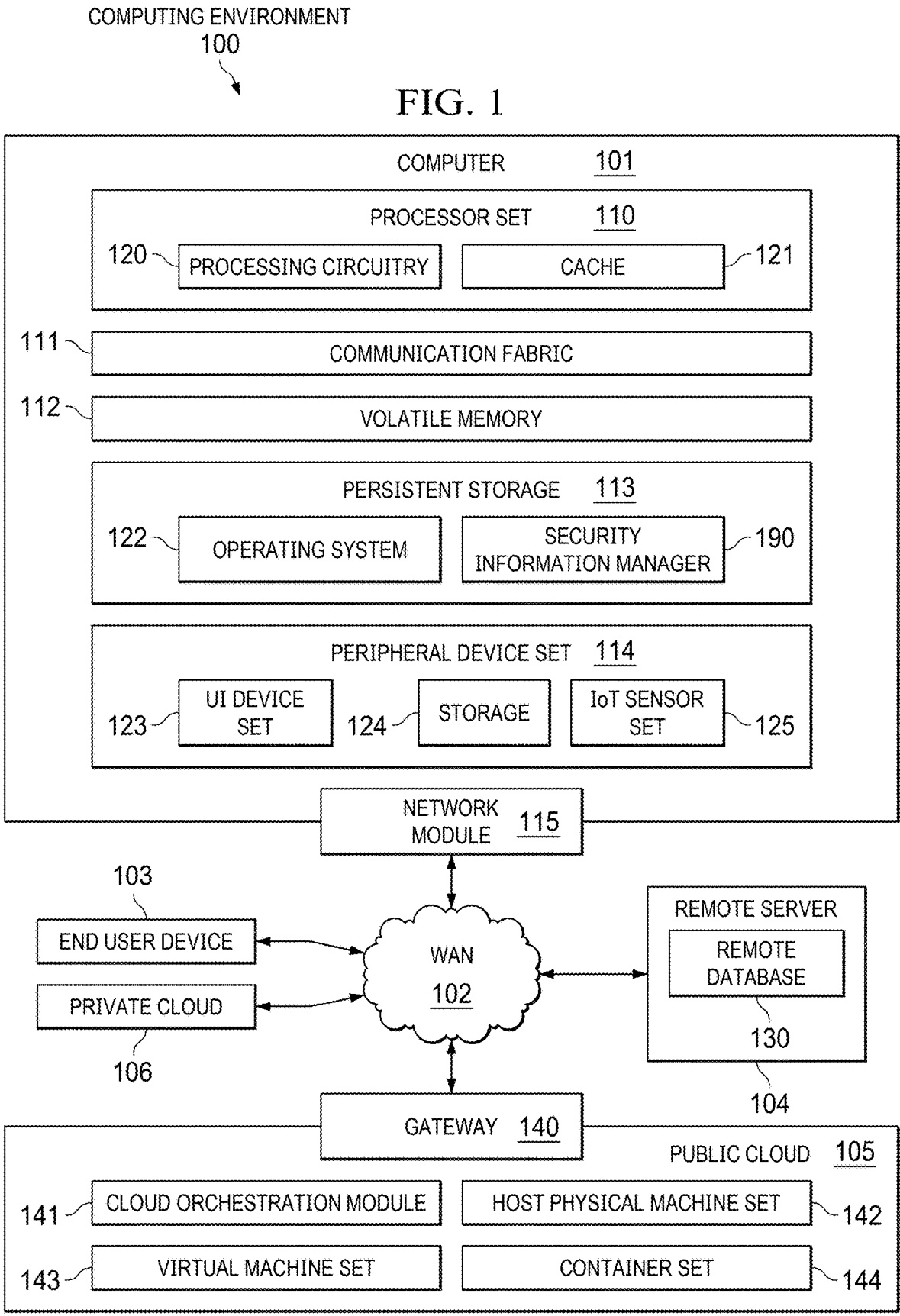
FIG. 1 is a pictorial representation of a computing environment in which illustrative embodiments may be implemented.

A computer implemented method manages versions of security information. A processor set receives a request to add a first version of security information for a number of pods in an orchestration platform. The processor set stores the first version of the security information into a set of security information in a metadata database in the orchestration platform. The set of security information comprises the security information of different versions. The processor set stores a new destination rule for the first version of the security information into a set of destination rules in the metadata database. Destination rules in the set of destination rules defines versions of the security information to be consumed by different pods from the number of pods. The processor set deploys a pod from the number of pods. The number of pods comprises pods to be deployed in the orchestration platform. The pod from the number of pods consumes a version of the security information during deployment based on the set of destination rules. As a result, the illustrative embodiments provide a technical effect of providing an orchestration platform that supports management of multiple different versions of security information for pods deployed on the orchestration platform.

In the illustrative embodiments, the processor set receives a second request to invalidate a second version of security information from the set of security information stored in the metadata database in the orchestration platform. The processor set identifies a subset of destination rules associated with the second version of security information from the set of destination rules stored in the metadata database in the orchestration platform. The processor set invalidates the second version of security information from the set of security information and the subset of destination rules from the set of destination rules in the metadata database. As a result, the illustrative embodiments provide a technical effect of removing or disabling existing versions of security information such that pods can be deployed and operated smoothly on the orchestration platform.

In the illustrative embodiments, as part of deploying a pod from the number of pods, the processor set extracts the set of destination rules from the metadata database in the orchestration platform. The processor set identifies the version of security information for the pod from the number of pods based on the set of destination rules. The processor receives the version of security information from the set of security information stored in the metadata database in the orchestration platform. As a result, the illustrative embodiments provide a technical effect of identifying correct versions of security information for deployed pods using the set of destination rules.

In the illustrative embodiments, the processor set converts the version of security information for the pod to environment variables to be consumed by the pod. As a result, the illustrative embodiments provide a technical effect of passing different versions of security information values to different pods such that multiple versions of security information can be supported in orchestration platforms.

In the illustrative embodiments, pod labels for the pod to be deployed are extracted with the set of destination rules. As a result, the illustrative embodiments provide a technical effect of efficiently identifying correct versions of security information for pods to be deployed by utilizing pod labels from the pods to be deployed.

In the illustrative embodiments, the set of destination rules are defined to map the set of security information to pod labels for pods in the number of pods. As a result, the illustrative embodiments provide a technical effect of accurately identifying correct versions of security information for pods by mapping versions of security information to different pods.

In the illustrative embodiments, the first version of security information is converted into a format supported by the orchestration platform. As a result, the illustrative embodiments provide a technical effect of standardizing external security information with existing versions of security information stored on the orchestration platform in a unified format.

A computer system comprises a processor set, a set of one or more computer-readable storage media, and program instructions, stored in the set of one or more computer-readable storage media, to cause the processor set to perform the following computer operations. The processor set receives a request to add a first version of security information for a number of pods in an orchestration platform. The number of pods comprises pods to be deployed in the orchestration platform. The processor set stores the first version of the security information into a set of security information in a metadata database in the orchestration platform. The set of security information comprises the security information of different versions. The processor set stores a new destination rule for the first version of the security information into a set of destination rules in the metadata database. Destination rules in the set of destination rules defines versions of the security information to be consumed by different pods from the number of pods. The processor set deploys a pod from the number of pods. The pod from the number of pods consumes a version of the security information during deployment based on the set of destination rules. As a result, the illustrative embodiments provide a technical effect of providing an orchestration platform that supports management of multiple different versions of security information for pods deployed on the orchestration platform.

In the illustrative embodiments, the processor set further executes the program instructions to receive a second request to invalidate a second version of security information from the set of security information stored in the metadata database in the orchestration platform. The processor set further executes the program instructions to identify a subset of destination rules associated with the second version of security information from the set of destination rules stored in the metadata database in the orchestration platform. The processor set further executes the program instructions to invalidate the second version of security information from the set of security information and the subset of destination rules from the set of destination rules in the metadata database. As a result, the illustrative embodiments provide a technical effect of removing or disabling existing versions of security information such that pods can be deployed and operated smoothly on the orchestration platform.

In the illustrative embodiments, as part of deploying a pod from the number of pods, the processor set further executes the program instructions to extract the set of destination rules from the metadata database in the orchestration platform. The processor set further executes the program instructions to identify the version of security information for the pod from the number of pods based on the set of destination rules. The processor set further executes the program instructions to receive the version of security information from the set of security information stored in the metadata database in the orchestration platform. As a result, the illustrative embodiments provide a technical effect of identifying correct versions of security information for deployed pods using the set of destination rules.

In the illustrative embodiments, the processor set further executes the program instructions to convert the version of security information for the pod to environment variables to be consumed by the pod. As a result, the illustrative embodiments provide a technical effect of passing different versions of security information values to different pods such that multiple versions of security information can be supported in orchestration platforms.

In the illustrative embodiments, pod labels for the pod to be deployed are extracted with the set of destination rules. As a result, the illustrative embodiments provide a technical effect of efficiently identifying correct versions of security information for pods to be deployed by utilizing pod labels from the pods to be deployed.

In the illustrative embodiments, the set of destination rules are defined to map the set of security information to pod labels for pods in the number of pods. As a result, the illustrative embodiments provide a technical effect of accurately identifying correct versions of security information for pods by mapping versions of security information to different pods.

In the illustrative embodiments, the first version of security information is converted into a format supported by the orchestration platform. As a result, the illustrative embodiments provide a technical effect of standardizing external security information with existing versions of security information stored on the orchestration platform in a unified format.

In the illustrative embodiments, a computer program product manages different versions of security information. The computer program product comprises a set of one or more computer-readable storage media and program instructions, stored in the set of one or more computer-readable storage media, for causing a processor set to perform the following computer operations. The program instructions are executable by a computer system to receive a request to add a first version of security information for a number of pods in an orchestration platform. The number of pods comprises pods to be deployed in the orchestration platform. The program instructions are executable by the computer system to cause the computer system to store the first version of the security information into a set of security information in a metadata database in the orchestration platform. The set of security information comprises the security information of different versions. The program instructions are executable by the computer system to cause the computer system to store a new destination rule for the first version of the security information into a set of destination rules in the metadata database. Destination rules in the set of destination rules defines versions of the security information to be consumed by different pods from the number of pods. The program instructions are executable by the computer system to cause the computer system to deploy a pod from the number of pods. The pod from the number of pods consumes a version of the security information during deployment based on the set of destination rules. As a result, the illustrative embodiments provide a technical effect of providing an orchestration platform that supports management of multiple different versions of security information for pods deployed on the orchestration platform.

In the illustrative embodiments, the program instructions are further executable by the computer system to cause the computer system to receive a second request to invalidate a second version of security information from the set of security information stored in the metadata database in the orchestration platform. The program instructions are further executable by the computer system to cause the computer system to identify a subset of destination rules associated with the second version of security information from the set of destination rules stored in the metadata database in the orchestration platform. The program instructions are further executable by the computer system to cause the computer system to invalidate the second version of security information from the set of security information and the subset of destination rules from the set of destination rules in the metadata database. As a result, the illustrative embodiments provide a technical effect of removing or disabling existing versions of security information such that pods can be deployed and operated smoothly on the orchestration platform.

In the illustrative embodiments, as part of deploying a pod from the number of pods, the program instructions are further executable by the computer system to cause the computer system to extract the set of destination rules from the metadata database in the orchestration platform. The program instructions are further executable by the computer system to cause the computer system to identify the version of security information for the pod from the number of pods based on the set of destination rules. The program instructions are further executable by the computer system to cause the computer system to receive the version of security information from the set of security information stored in the metadata database in the orchestration platform. As a result, the illustrative embodiments provide a technical effect of identifying correct versions of security information for deployed pods using the set of destination rules.

In the illustrative embodiments, the program instructions are further executable by the computer system to cause the computer system to convert the version of security information for the pod to environment variables to be consumed by the pod. As a result, the illustrative embodiments provide a technical effect of passing different versions of security information values to different pods such that multiple versions of security information can be supported in orchestration platforms.

In the illustrative embodiments, pod labels for the pod to be deployed are extracted with the set of destination rules. As a result, the illustrative embodiments provide a technical effect of efficiently identifying correct version of security information for pods to be deployed by utilizing pod labels from the pods to be deployed.

In the illustrative embodiments, the set of destination rules are defined to map the set of security information to pod labels for pods in the number of pods. As a result, the illustrative embodiments provide a technical effect of accurately identifying correct versions of security information for pods by mapping versions of security information to different pods.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as security information manager 190. In addition to security information manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and security information manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in security information manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in security information manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICRO-SERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that orchestration platforms need to be designed with robust security measures to prevent unauthorized access, data breaches, and disruptions.

The illustrative embodiments also recognize and take into account that integration of security mechanisms into orchestration platforms is crucial because these orchestration platforms often manage sensitive, large-scale operations across diverse environments. In this case, breaches or security failures can compromise critical business processes, lead to data leaks, or disrupt services.

In addition, the illustrative embodiments also recognize and take into account that current extension of orchestration platforms can only support a single version of security information. The illustrative embodiments also recognize and take into account that the capability of orchestration platforms to only support a single version of security information can cause technical issues for typical cloud application scenarios such as grayscale release or rolling update, in-place debugging, and environment sharing.

Thus, illustrative embodiments of the present invention provide a computer implemented method, computer system, and computer program product for managing different versions of security information in an orchestration platform. A processor set receives a request to add a first version of security information for a number of pods in an orchestration platform. The processor set stores the first version of the security information into a set of security information in a metadata database in the orchestration platform. The set of security information comprises the security information of different versions. The processor set stores a new destination rule for the first version of the security information into a set of destination rules in the metadata database. Destination rules in the set of destination rules defines versions of the security information to be consumed by different pods from the number of pods. The processor set deploys a pod from the number of pods. The pod from the number of pods consumes a version of the security information during deployment based on the set of destination rules.

Figure 2:
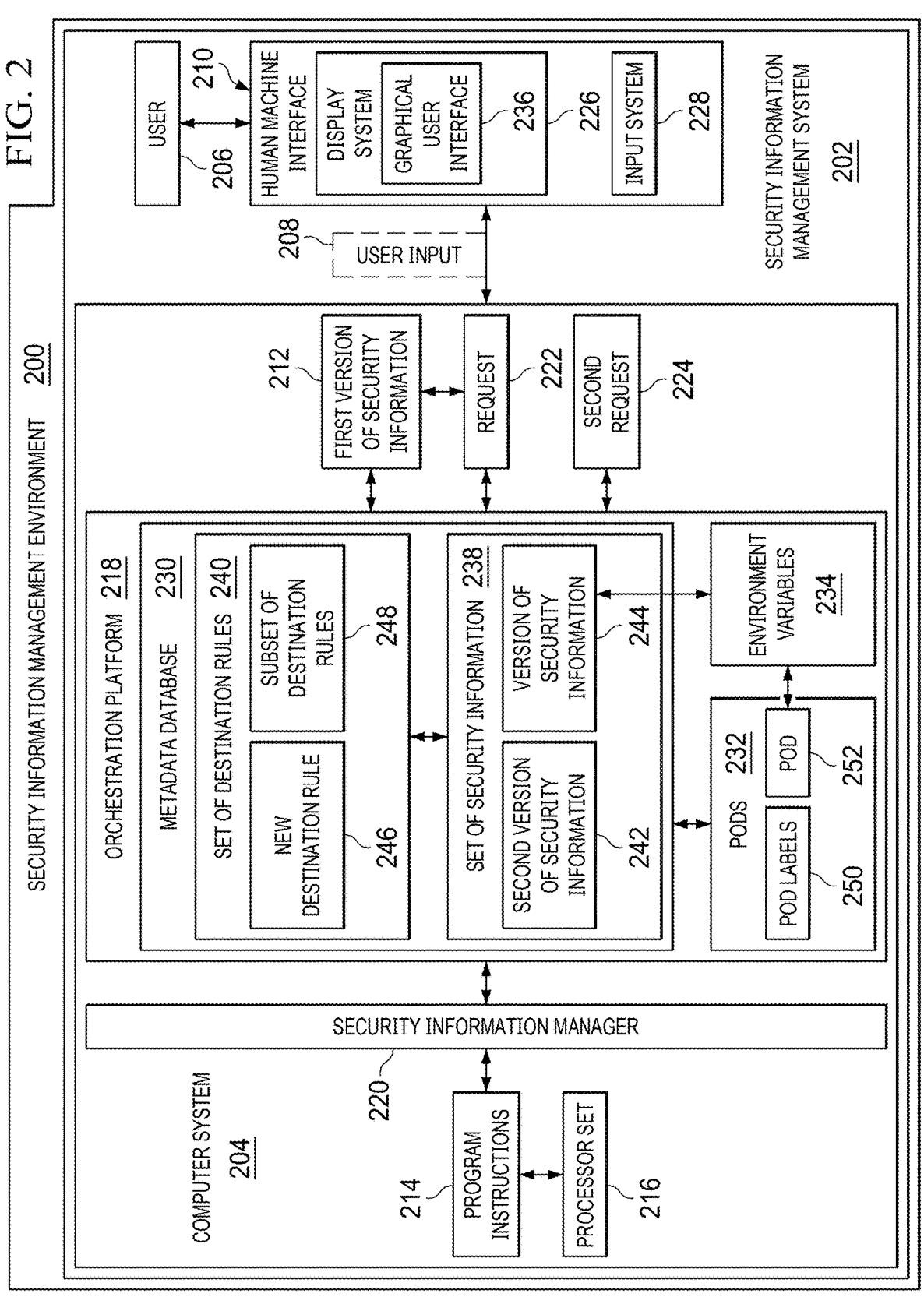
FIG. 2 is an illustration of a block diagram of a security information management environment in accordance with an illustrative embodiment.

With reference now to FIG. 2, an illustration of a block diagram of a security information management environment is depicted in accordance with an illustrative embodiment. In this illustrative example, security information management environment 200 includes components that can be implemented in hardware such as the hardware shown in computing environment 100 in FIG. 1.

In this illustrative example, security information management system 202 in security information management environment 200 can be used for managing different versions of security information for pods 232 in orchestration platform 218. In this illustrative example, security information management system 202 includes computer system 204 which includes security information manager 220. Security information manager 220 is located in computer system 204. Security information manager 220 may be implemented using security information manager 190 in FIG. 1.

Security information manager 220 can be implemented in software, hardware, firmware, or a combination thereof.

When software is used, the operations performed by security information manager 220 can be implemented in program instructions configured to run on hardware, such as a processor unit. When firmware is used, the operations performed by security information manager 220 can be implemented in program instructions and data and stored in persistent memory to run on a processor unit. When hardware is employed, the hardware can include circuits that operate to perform the operations in security information manager 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, "security information" refers to the data, protocols, and mechanisms implemented to ensure confidentiality, integrity, and availability of processes, data, and services within orchestration platform. For example, security information can be secrets for Kubernetes® platform. In this example, secrets are objects that contain small amounts of sensitive data such as passwords, tokens, or keys. Such sensitive data can be put in a pod specification in a container image such that those sensitive data does not need to be included in application code.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes orchestration platform 218. Orchestration platform 218 is a system designed to manage and automate the configuration, deployment, and operation of components in a software environment. For example, orchestration platform 218 can be Kubernetes® platform, which is an open-source system for automating the deployment, scaling, and management of containerized applications such as pods 232.

In this illustrative example, orchestration platform 218 can include a number of nodes. Nodes for orchestration platform 218 are physical or virtual machines that are responsible for managing and executing containerized applications to run workloads. In other words, workloads are applications and services that run on nodes for orchestration platform 218. In this illustrative example, workloads can be packaged as containerized applications and are managed through abstractions for orchestration platform 218. For example, workloads can be packaged as pods such as pods 232 if orchestration platform 218 is a Kubernetes® platform. In this example, pods such as pods 232 are groups of one or more containers that share storage, network, and configurations for how to run the containers. In this illustrative example, containers are lightweight, portable, and self-sufficient units that package an application along with dependencies, libraries, and configuration files for the application.

As depicted, pods such as pods 232 are deployed in orchestration platform 218. In this illustrative example, pods 232 consume security information from set of security information 238 during deployment for running applications within pods 232. Without consuming security information from set of security information 238, sensitive data such as passwords, application programming interface (API) keys, and encryption keys would have to be hard-coded into applications included in pods 232, which increases the risk of exposing those sensitive data.

Set of security information 238 are stored in metadata database 230 for orchestration platform 218. In this illustrative example, metadata database 230 is a data storage that holds metadata related to the processes, tasks, workflows, and resources involved in orchestrating various automated activities in orchestration platform 218. For example, metadata database 230 can be used to keep information about how workloads are executed, dependencies between services, state of workflows, configurations, security information for running applications, and system logs. In other words, metadata database 230 acts as a central repository for managing and tracking overall orchestration process for orchestration platform 218.

In this illustrative example, set of security information 238 stored in metadata database 230 includes security information of different versions. In this illustrative example, different versions of security information can be added to set of security information 238 in a number of ways. For example, security information manager 220 can receive request 222 for adding first version of security information 212 from an external source to set of security information 238.

In this example, security information manager 220 can convert first version of security information 212 into a format supported by orchestration platform 218 before storing first version of security information 212 to set of security information 238 along with other versions of security information that are associated with first version of security information 212 in metadata database 230. In other words, security information manager 220 saves all versions of security information in set of security information 238.

In this illustrative example, security information manager 220 can further create new destination rule 246 for first version of security information 212. New destination rule 246 can be stored in set of destination rules 240 in metadata database 230. In this illustrative example, destination rules in set of destination rules 240 define versions of security information to be consumed by different pods in pods 232. For example, new destination rule 246 defines which pods in pods 232 are designated to consume first version of security information 212 upon deployment.

In this illustrative example, security information manager 220 can create destination rules such as new destination rule 246 by mapping set of security information 238 to pod labels 250 for pods 232. In this illustrative example, pod labels 250 are metadata that are assigned to different pods for group, select, and manage pods based on specific criteria. Pod labels 250 helps to differentiate between pods running different services, versions, or configurations. In other words, the set of destination rules 240 are defined to map set of security information 238 to pod labels 250 such that security information manager 220 can easily identify correct versions of security information for different pods in pods 232. In this illustrative example, security information manager 220 can further utilize label selectors to query and filter resources based on pod labels 250. For example, the label selectors can be a simple label selector that matches a pod from pods 232 with an exact pod label from pod labels 250. Alternatively, the label selectors can be equity-based selectors that allow users to select resources such as pods 232 based on whether a specific pod label from pod labels 250 has a particular value. In an alternative example, the label selectors can be set-based selectors that allow users to select resources such as pods 232 based on whether a label key's value for a pod label from pod labels 250 exists within a set of values, or if it is missing. In this illustrative example, it should be understood that the label selectors can be implemented using complex logical expression to combine all above mentioned equity statements.

For example, pod 252 from pods 232 can be deployed in orchestration platform 218. In this example, security information manager 220 can extract set of destination rules 240 and identify version of security information 244 from set of security information 238 to be consumed by pod 252 based on set of destination rules 240 upon deployment. In other words, security information manager 220 relies on set of destination rules 240 to identify version of security information 244, which is the correct version of security information designated to be consumed by pod 252. In this illustrative example, security information manager 220 can also extract pod labels 250 along with set of security information 238 for efficiently identifying version of security information 244.

In this illustrative example, security information manager 220 can convert version of security information 244 to environment variables 234, which can be consumed by pod 252 for running applications in pod 252.

In this illustrative example, security information manager 220 can also invalidate security information in set of security information 238. For example, security information manager 220 can receive second request 224 for invalidating second version of security information 242 from set of security information 238. In this illustrative example, security information manager 220 identifies subset of destination rules 248 associated with second version of security information 242 from set of destination rules 240.

Subsequently, security information manager 220 invalidates second version of security information 242 and subset of destination rules 248 in response to second request 224. In other words, all destination rules that are associated with second version of security information 242 are invalidated along with second version of security information 242 such that deployment of pods 232 will no longer involve consuming second version of security information 242. In this illustrative example, invalidation of second version of security information 242 and subset of destination rules 248 can be achieved in a number of ways. For example, security information manager 220 can perform the invalidation by removing or disabling second version of security information 242 and subset of destination rules 248.

In this illustrative example, user 206 can interact with computer system 204 through user inputs to computer system 204. For example, computer system 204 can receive user input 208 that includes request 222 and second request 224.

In this illustrative example, user input 208 can be generated by user 206 using human machine interface (HMI) 210. As depicted, human machine interface 210 includes display system 226 and input system 228. Display system 226 is a physical hardware system and includes one or more display devices on which graphical user interface 236 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 236 through user input 208 generated by input system 228. Input system 228 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. For example, user 206 can view set of security information 238 and set of destination rules 240 through graphical user interface 236 to ensure accuracies for set of security information 238 and set of destination rules 240.

In one illustrative example, one or more solutions are present that overcome a problem with managing multiple versions of security information in an orchestration platform. As a result, one or more technical solutions may provide an ability to increase the efficiency and performance in computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which security information manager 220 in computer system 204 enables management of multiple versions of security information in orchestration platforms. In particular, security information manager 220 transforms computer system 204 into a special purpose computer system as compared to currently available general computer systems that do not have security information manager 220.

In the illustrative example, the use of security information manager 220 in computer system 204 integrates processes into a practical application for managing multiple versions of security information in orchestration platforms such that correct versions of security information can be efficiently identified for pods upon deployments. In other words, security information manager 220 in computer system 204 is directed to a practical application of processes integrated into security information manager 220 in computer system 204 that supports management for multiple versions of security information. In this illustrative example, security information manager 220 can efficiently help computer system 204 to increase computer performance and avoid wasting computing resources because efficiently identifying correct version of security information for pods during deployment provide significant technical advantages.

For example, efficiently identifying correct versions of security information ensures sensitive information included in the security information is protected. By using the correct version of security information, users can minimize the risk of security breaches, as outdated or compromised credentials are not inadvertently used.

In addition, using an incorrect version of security information during pod deployment can result in errors that can be difficult to diagnose. For example, using an incorrect version of security information can cause failure of connections to databases, services, or APIs. Therefore, using an incorrect version of security information during pod deployment can reduce the above mentioned errors and minimize debugging overhead for keeping applications stable and running smoothly.

The illustration of security information management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, version of security information 244 can be any version of security information in set of security information 238, including first version of security information 212 and second version of security information 242. In a similar fashion, second version of security information 242 can be any version of security information in set of security information 238, including first version of security information 212 and version of security information 244.

With reference now to FIG. 3A-3C, illustrations of sample scripts for deploying pods are shown in accordance with an illustrative embodiment. In this illustrative example, sample scripts shown in FIG. 3A-3C can be examples of scripts for deploying pods 232 in FIG. 2. In this illustrative example, sample scripts shown in FIG. 3A-3C are used for Kubernetes® platform.

In FIG. 3A, a sample deployment script for deploying a pod with a container is shown in accordance with an illustrative embodiment. In this illustrative example, portion 300 is used to assign a label to the resources being deployed.

In addition, portion 302 shows security information that may be used for deploying the resources described by the sample deployment script shown in FIG. 3A. In this illustrative example, portion 302 includes names and values for the security information that may be used for deploying the resources.

With reference now to FIG. 3B, a sample destination rule is shown in accordance with an illustrative embodiment. In this illustrative example, the sample destination rule shown in FIG. 3B can be an example of new destination rule 246, or any destination rule from set of destination rules 240 and subset of destination rules 248.

As depicted, portion 304 in FIG. 3B defines versions of security information to be consumed by different pods or containers. For example, portion 304 indicates mapping rules for security information "kmip-private-key". In this example, version 1 of security information "kmip-private-key" is mapped with label "app:kmipserver" and version 2 of security information "kmip-private-key" is mapped with label "app:kmipserver-v2". In other words, portion 304 can be used for identifying versions of security information "kmip-private-key" to be consumed by pods or containers with label "app:kmipserver" and "app:kmipserver-v2".

In this illustrative example, version 1 of security information "kmip-private-key" may be used for deploying the resources described by the sample deployment script shown in FIG. 3A based on portion 304 shown in FIG. 3B.

With reference now to FIG. 3C, a sample security information is shown in accordance with an illustrative embodiment. In this illustrative example, sample security information 306 shown in FIG. 3C can be an example of first version of security information 212, second version of security information 242, version of security information 244, or any security information in set of security information 238. In this illustrative example, sample security information 306 shown in FIG. 3C illustrates an extension of a secret format for Kubernetes® platform such as Kubernetes secret format, which does not include version branches.

In this illustrative example, sample security information 306 includes information associated with different versions of security information. For example, sample security information 306 shows version 1 and version 2 for security information "kmip-private-key" and data for version 1 and version 2 of security information "kmip-private-key".

With reference now to FIG. 4, a flowchart illustrating a process for managing versions of security information is shown in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in security information manager 220 in computer system 204 in FIG. 2.

The process begins by receiving a request to add a first version of security information for a number of pods in an orchestration platform (step 400). In step 400, the number of pods includes pods to be deployed in the orchestration platform. The process stores the first version of the security information into a set of security information in a metadata database in the orchestration platform (step 402). In step 402, the set of security information comprises the security information of different versions.

The process stores a new destination rule for the first version of the security information into a set of destination rules in the metadata database (step 404). In step 404, destination rules in the set of destination rules defines versions of the security information to be consumed by different pods from the number of pods. The process deploys a pod from the number of pods (step 406). In step 406, the pod from the number of pods consumes a version of the security information during deployment based on the set of destination rules. The process terminates thereafter.

With reference now to FIG. 5, a flowchart illustrating a process for invalidating a version of security information is shown in accordance with an illustrative embodiment. The process in this figure is an example of an additional step that can be performed with the steps in FIG. 4.

The process begins by receiving a second request to invalidate a second version of security information from the set of security information stored in the metadata database in the orchestration platform (step 500). The process identifies a subset of destination rules associated with the second version of security information from the set of destination rules stored in the metadata database in the orchestration platform (step 502). The process invalidates the second version of security information from the set of security information and the subset of destination rules from the set of destination rules in the metadata database (step 504). The process terminates thereafter.

With reference now to FIG. 6, a flowchart illustrating a process for identifying a version of security information to deploy a pod is shown in accordance with an illustrative embodiment. The process in this flowchart is an example of an implementation for step 406 in FIG. 4.

The process begins by extracting the set of destination rules from the metadata database in the orchestration platform (step 600). The process identifies the version of security information for the pod from the number of pods based on the set of destination rules (step 602). The process receives the version of security information from the set of security information stored in the metadata database in the orchestration platform (step 604). The process terminates thereafter.

With reference now to FIG. 7, a flowchart illustrating a process for converting the version of security information to environment variables is shown in accordance with an illustrative embodiment. The process in this figure is an example of an additional step that can be performed with the steps in FIG. 6.

The process begins by converting the version of security information for the pod to environment variables to be consumed by the pod (step 700). The process terminates thereafter.

Figure 8:
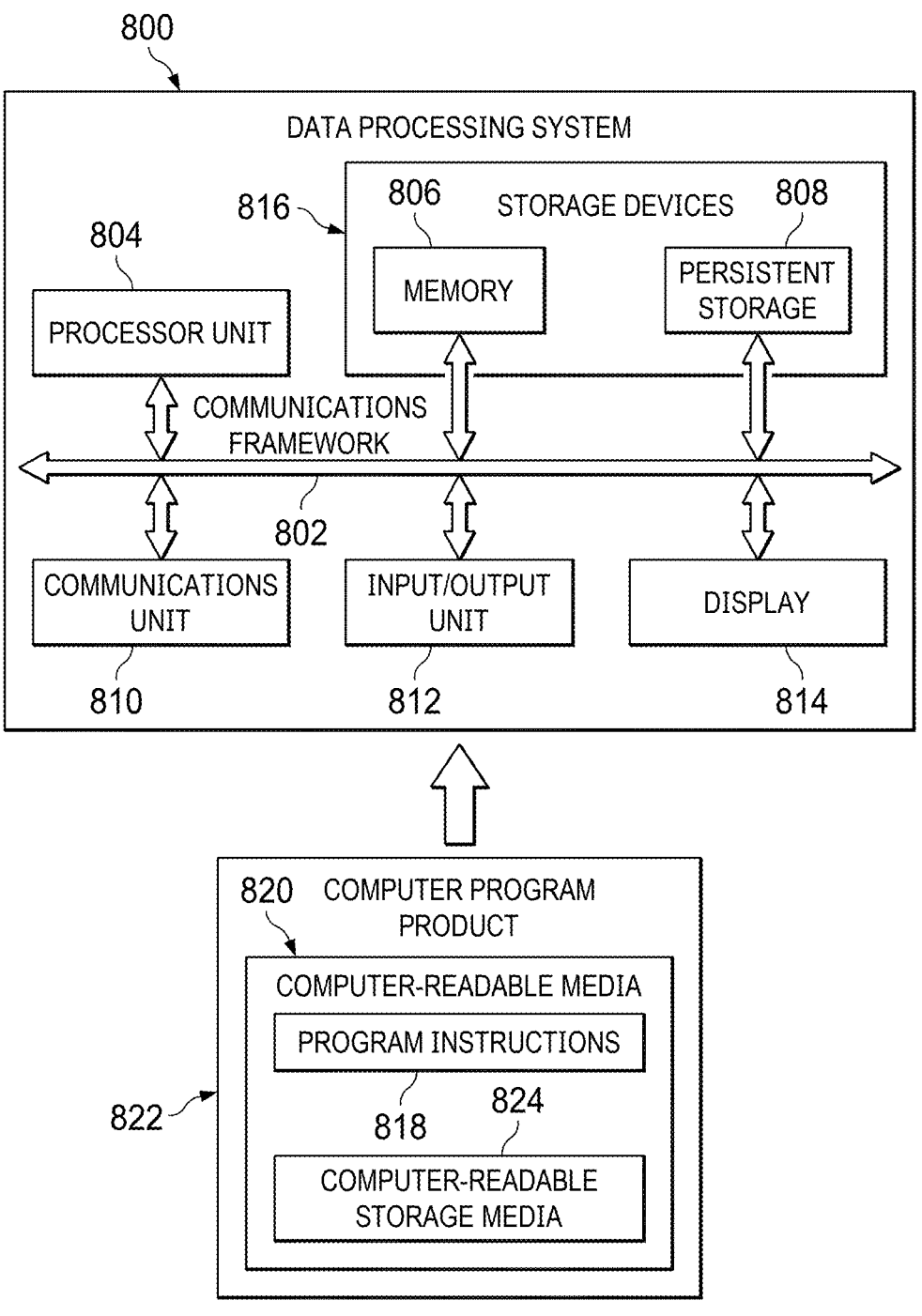
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement computers and computing devices in computing environment 100 in FIG. 1. Data processing system 800 can also be used to implement computer system 204 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can be implemented using one or more heterogeneous processor systems in which a main processor is present with secondary processors on a single chip. As another illustrative example, processor unit 804 can be a symmetric multiprocessor system containing multiple processors of the same type on a single chip.

Memory 806 and persistent storage 808 are examples of storage devices 816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program instructions, computer usable program instructions, or computer-readable program instructions that can be read and executed by a processor in processor unit 804. The program instructions in the different embodiments can be embodied on different physical or computer-readable storage media, such as memory 806 or persistent storage 808.

Program instructions 818 are located in a functional form on computer-readable media 820 that is selectively removable and can be loaded onto or transferred to data processing system 800 for execution by processor unit 804. Program instructions 818 and computer-readable media 820 form computer program product 822 in these illustrative examples. In the illustrative example, computer-readable media 820 is computer-readable storage media 824.

Computer-readable storage media 824 is a physical or tangible storage device used to store program instructions 818 rather than a medium that propagates or transmits program instructions 818. Computer-readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 818 can be transferred to data processing system 800 using a computer-readable signal media. The computer-readable signal media are signals and can be, for example, a propagated data signal containing program instructions 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program instructions 818 can be located in computer-readable media 820 in the form of a single storage device or system. In another example, program instructions 818 can be located in computer-readable media 820 that is distributed in multiple data processing systems. In other words, some instructions in program instructions 818 can be located in one data processing system while other instructions in program instructions 818 can be located in one data processing system. For example, a portion of program instructions 818 can be located in computer-readable media 820 in a server computer while another portion of program instructions 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program instructions 818.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing versions of security information, the computer implemented method comprising:

receiving, by a processor set, a request to add a first version of security information for a number of pods in an orchestration platform, wherein the number of pods comprises pods to be deployed in the orchestration platform;

storing, by the processor set, the first version of the security information into a set of security information in a metadata database in the orchestration platform, wherein the set of security information comprises the security information of different versions;

storing, by the processor set, a new destination rule for the first version of the security information into a set of destination rules in the metadata database, wherein destination rules in the set of destination rules defines versions of the security information to be consumed by different pods from the number of pods; and deploying, by the processor set, a pod from the number of pods, wherein the pod from the number of pods consumes a version of the security information during deployment based on the set of destination rules.

2. The computer implemented method of claim 1, further comprising:

receiving, by the processor set, a second request to invalidate a second version of security information from the set of security information stored in the metadata database in the orchestration platform;

identifying, by the processor set, a subset of destination rules associated with the second version of security information from the set of destination rules stored in the metadata database in the orchestration platform; and invalidating, by the processor set, the second version of security information from the set of security information and the subset of destination rules from the set of destination rules in the metadata database.

3. The computer implemented method of claim 1, wherein the deploying, by the processor set, a pod from the number of pods comprises:

extracting, by the processor set, the set of destination rules from the metadata database in the orchestration platform;

identifying, by the processor set, the version of security information for the pod from the number of pods based on the set of destination rules; and receiving, by the processor set, the version of security information from the set of security information stored in the metadata database in the orchestration platform.

4. The computer implemented method of claim 3, further comprising:

converting, by the processor set, the version of security information for the pod to environment variables to be consumed by the pod.

5. The computer implemented method of claim 3, wherein pod labels for the pod to be deployed are extracted with the set of destination rules.

6. The computer implemented method of claim 1, wherein the set of destination rules are defined to map the set of security information to pod labels for pods in the number of pods.

7. The computer implemented method of claim 1, wherein the first version of security information is converted into a format supported by the orchestration platform.

8. A computer system for managing versions of security information, comprising:

a processor set;

a set of one or more computer-readable storage media; and program instructions stored on the set of one or more computer-readable storage media to cause the processor set to perform operations comprising:

receiving a request to add a first version of security information for a number of pods in an orchestration platform, wherein the number of pods comprises pods to be deployed in the orchestration platform;

storing the first version of the security information into a set of security information in a metadata database in the orchestration platform, wherein the set of security information comprises the security information of different versions;

storing a new destination rule for the first version of the security information into a set of destination rules in the metadata database, wherein destination rules in the set of destination rules defines versions of the security information to be consumed by different pods from the number of pods; and deploying a pod from the number of pods, wherein the pod from the number of pods consumes a version of the security information during deployment based on the set of destination rules.

9. The computer system of claim 8, wherein the operations further comprise:

receiving a second request to invalidate a second version of security information from the set of security information stored in the metadata database in the orchestration platform;

identifying a subset of destination rules associated with the second version of security information from the set of destination rules stored in the metadata database in the orchestration platform; and invalidating the second version of security information from the set of security information and the subset of destination rules from the set of destination rules in the metadata database.

10. The computer system of claim 8, wherein the deploying a pod from the number of pods comprises:

extracting the set of destination rules from the metadata database in the orchestration platform;

identifying the version of security information for the pod from the number of pods based on the set of destination rules; and receiving the version of security information from the set of security information stored in the metadata database in the orchestration platform.

11. The computer system of claim 10, wherein the operations further comprise:

converting the version of security information for the pod to environment variables to be consumed by the pod.

12. The computer system of claim 10, wherein pod labels for the pod to be deployed are extracted with the set of destination rules.

13. The computer system of claim 8, wherein the set of destination rules are defined to map the set of security information to pod labels for pods in the number of pods.

14. The computer system of claim 8, wherein the first version of security information is converted into a format supported by the orchestration platform.

15. A computer program product for managing versions of security information, comprising:

a set of one or more computer-readable storage media;

program instructions stored in the set of one or more computer-readable storage media to perform operations comprising:

receiving, by a processor set, a number of data pairs, wherein each data pair in the number of data pairs comprises an input data and an output data that is semantically equivalent to the input data, wherein the number of pods comprises pods to be deployed in the orchestration platform;

receiving, by a processor set, a request to add a first version of security information for a number of pods in an orchestration platform;

storing, by the processor set, the first version of the security information into a set of security information in a metadata database in the orchestration platform, wherein the set of security information comprises the security information of different versions;

storing, by the processor set, a new destination rule for the first version of the security information into a set of destination rules in the metadata database, wherein destination rules in the set of destination rules defines versions of the security information to be consumed by different pods from the number of pods; and deploying, by the processor set, a pod from the number of pods, wherein the pod from the number of pods consumes a version of the security information during deployment based on the set of destination rules.

16. The computer program product of claim 15, wherein the operations further comprise:

receiving, by the processor set, a second request to invalidate a second version of security information from the set of security information stored in the metadata database in the orchestration platform;

identifying, by the processor set, a subset of destination rules associated with the second version of security information from the set of destination rules stored in the metadata database in the orchestration platform; and invalidating, by the processor set, the second version of security information from the set of security information and the subset of destination rules from the set of destination rules in the metadata database.

17. The computer program product of claim 15, wherein the deploying, by the processor set, a pod from the number of pods:

extracting, by the processor set, the set of destination rules from the metadata database in the orchestration platform;

identifying, by the processor set, the version of security information for the pod from the number of pods based on the set of destination rules; and receiving, by the processor set, the version of security information from the set of security information stored in the metadata database in the orchestration platform.

18. The computer program product of claim 17, wherein the operations further comprise:

converting, by the processor set, the version of security information for the pod to environment variables to be consumed by the pod.

19. The computer program product of claim 17, wherein pod labels for the pod to be deployed are extracted with the set of destination rules.

20. The computer program product of claim 15, wherein the set of destination rules are defined to map the set of security information to pod labels for pods in the number of pods.

* * * * *